United States Patent
Moorti et al.

(10) Patent No.: US 7,269,430 B2
(45) Date of Patent: Sep. 11, 2007

(54) FRAME FORMAT FOR HIGH DATA THROUGHPUT WIRELESS LOCAL AREA NETWORK TRANSMISSIONS

(75) Inventors: Tushar Moorti, Mountain View, CA (US); Christopher J. Hansen, Sunnyvale, CA (US); Jason A. Trachewsky, Menlo Park, CA (US)

(73) Assignee: Broadcom Corporation, Irvine, CA (US)

( * ) Notice: Subject to any disclaimer, the term of this patent is extended or adjusted under 35 U.S.C. 154(b) by 778 days.

(21) Appl. No.: 10/778,751

(22) Filed: Feb. 13, 2004

(65) Prior Publication Data

US 2005/0113026 A1    May 26, 2005

Related U.S. Application Data

(60) Provisional application No. 60/524,528, filed on Nov. 24, 2003.

(51) Int. Cl.
*H04B 1/38* (2006.01)
*H04M 1/00* (2006.01)

(52) U.S. Cl. .................. 455/458; 455/414.4; 455/509; 455/511; 370/431; 370/901; 370/908

(58) Field of Classification Search ................ 455/403, 455/414.1, 414.4, 458, 550.1, 554.2, 555, 455/426.2, 509, 511, 701; 370/338, 341, 370/259, 431, 506
See application file for complete search history.

(56) References Cited

OTHER PUBLICATIONS

Jianhua Liu, Jian Li and Petre Stoica, "A MIMO System With Backward Compatibility For OFDM Based WLANS," 2003 4th IEEE Workshop on Signal Processing Advances In Wireless Communications, 0-7803-7858-X/03, pp. 130-134.

XP-002236904, Part 11: Wireless LAN Medium Access Control (MAC) and Physical Laer (PHY) specifications: High-speed Physical Layer in the 5 GHZ Band, Sponsor: LAN/MAN Standards Committee of the IEEE Computer Society, IEEE Std 802. 11a-1999, Sep. 1999, pp. 1-53.

Takeshi Onizawa, Masato Mizoguchi, Masahiro Morikura and Toshiaki Tanaka, "A Fast Synchronization Scheme of OFDM Signals for High-Rate Wireless LAN," IEICE Trans. Commun., vol. E82-B. No. 2, Feb. 199, pp. 455-463.

Erik G. Larsson and Jia Li, "Preamble Design for Multiple-Antenna OFDM-Based WLANs With Null Subcarriers," IEEE Signal Processing Letters, vol. 8, No. 11, Nov. 2001, pp. 285-288.

XP-002298432, 802.11gTM, IEEE Standard for Information Technology, Part 11: Wireless LAN Medium Access Control (MAC) and Physical Layer (PHY) Specifications, Amendment 4: Further Data Rate Extension in the 2.4 GHz Band, IEEE Computer Society, Jun. 2003, pp. 1-78.

*Primary Examiner*—Tony T. Nguyen
*Assistant Examiner*—Thuan T. Nguyen
(74) *Attorney, Agent, or Firm*—Garlick Harrison & Markison; Timothy W. Markison

(57) ABSTRACT

A frame format for high data throughput wireless local area network transmissions includes a first preamble segment, a second preamble segment, and a variable length data segment. The first preamble segment includes a first training sequence, a second training sequence, and a high throughput channel indication, wherein the first training sequence is within a first set of subcarriers of a channel and the second training sequence is within a second set of subcarriers of the channel, wherein the first set of subcarriers is a subset of the second set of subcarriers. The second preamble segment includes a third training sequence within a third set of subcarriers of the channel, wherein the second set of subcarriers is a subset of the third set of subcarriers. The variable length data segment utilizes the third set of subcarriers to convey data.

20 Claims, 8 Drawing Sheets

| bits | channel configuration | | | |
| --- | --- | --- | --- | --- |
| | configuration | | | |
| | channel bandwidth | subcarriers | rate interpretation | space-time coding |
| 00001 | 20 MHz | 64 | 0 | 2 |
| 00010 | 20 MHz | 64 | 1 | 2 |
| 01000 | 40 MHz | 128 | 0 | 1 |
| 01001 | 40 MHz | 128 | 0 | 2 |
| 01010 | 40 MHz | 128 | 1 | 2 |
| 10000 | 10 MHz | 64 | 0 | 1 |
| 10001 | 10 MHz | 64 | 0 | 2 |
| 10010 | 10 MHz | 64 | 1 | 2 |

FIG. 7

1st training sequence 114

2nd training sequence 116

3rd training sequence 120

3rd training sequence 120

3rd training sequence 120

FRAME FORMAT FOR HIGH DATA THROUGHPUT WIRELESS LOCAL AREA NETWORK TRANSMISSIONS

CROSS REFERENCE TO RELATED PATENTS

This patent is claiming priority under 35 USC § 119 (e) to pending provisionally filed patent application entitled CONFIGURABLE SPECTRAL MASK FOR USE IN A HIGH DATA THROUGHPUT WIRELESS COMMUNICATION, having a provisional Ser. No. 60/524,528, and a filing date of Nov. 24, 2003.

BACKGROUND OF THE INVENTION

1. Technical Field of the Invention

This invention relates generally to wireless communication systems and more particularly to high data throughput communications in such systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

As is also known, the receiver is coupled to the antenna and includes a low noise amplifier, one or more intermediate frequency stages, a filtering stage, and a data recovery stage. The low noise amplifier receives inbound RF signals via the antenna and amplifies them. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

The assigned channel, or channels, over which the direct or indirect communication occurs is defined by the standard, or standards, supported by the wireless communication devices. For example, IEEE 802.11 (a) and (g) provide a channel spectral mask for 20 MHz orthogonal frequency division multiplexing (OFDM) channels. The standards also define the manner in which devices communicate over the channel. For example, the IEEE 802.11 (a) and (g) standards define a frame structure for communicating via a channel in a WLAN. The frame includes a preamble and a variable length data segment. The preamble includes a short training sequence, a long training sequence, and a signal field, which provides rate information of the data and length of the data segment.

Each receiving wireless communication device uses the frame preamble for signal detection, automatic gain control adjustments, diversity determinations, frequency adjustments, timing synchronization, and channel and fine frequency offset estimation. Such a frame format allows the wireless communication devices of a WLAN to communicate in a very specific manner. This frame format, however, does not accommodate higher data throughput rates, with backward compatibility to existing WLAN equipment, and various wireless channel configurations.

Therefore, a need exists for a new frame format that enables wireless communication devices to support a variety of wireless channel configurations and/or high throughput data rates.

BRIEF SUMMARY OF THE INVENTION

The frame format for high data throughput wireless local area network transmissions of the present invention substantially meets these needs and others. In one embodiment, a frame format for high data throughput wireless local area network transmissions includes a first preamble segment, a second preamble segment, and a variable length data segment. The first preamble segment includes a first training sequence, a second training sequence, and a high throughput channel indication, wherein the first training sequence is within a first set of subcarriers of a channel and the second training sequence is within a second set of subcarriers of the channel, wherein the first set of subcarriers is a subset of the second set of subcarriers. The second preamble segment includes a third training sequence within a third set of subcarriers of the channel, wherein the second set of subcarriers is a subset of the third set of subcarriers. The variable length data segment utilizes the third set of subcarriers to convey data.

In another embodiment, an apparatus for transmitting a frame within a high throughput wireless local area network includes a processing module, memory, and a radio frequency transmission circuit. The memory is operably coupled to the processing module, wherein the memory stores operational instructions that cause the processing module to prepare the frame by: generating a first preamble segment including a first training sequence, a second training sequence, and a high throughput channel indication, wherein the first training sequence is within a first set of subcarriers of a channel and the second training sequence is within a second set of subcarriers of the channel, wherein the first set of subcarriers is a subset of the second set of subcarriers; generating a second preamble segment including a third training sequence within a third set of subcarriers of the channel, wherein the second set of subcarriers is a subset of the third set of subcarriers; generating a variable length data segment utilizing the third set of subcarriers to convey data. The radio frequency transmission circuit is operably coupled to transmit the first preamble segment, the second preamble segment, and the variable length data segment as the frame.

BRIEF DESCRIPTION OF THE SEVERAL VIEWS OF THE DRAWINGS

FIG. 7 is a diagram of channel configurations in accordance with an embodiment of the present invention;

DETAILED DESCRIPTION OF THE INVENTION

Figure 1:
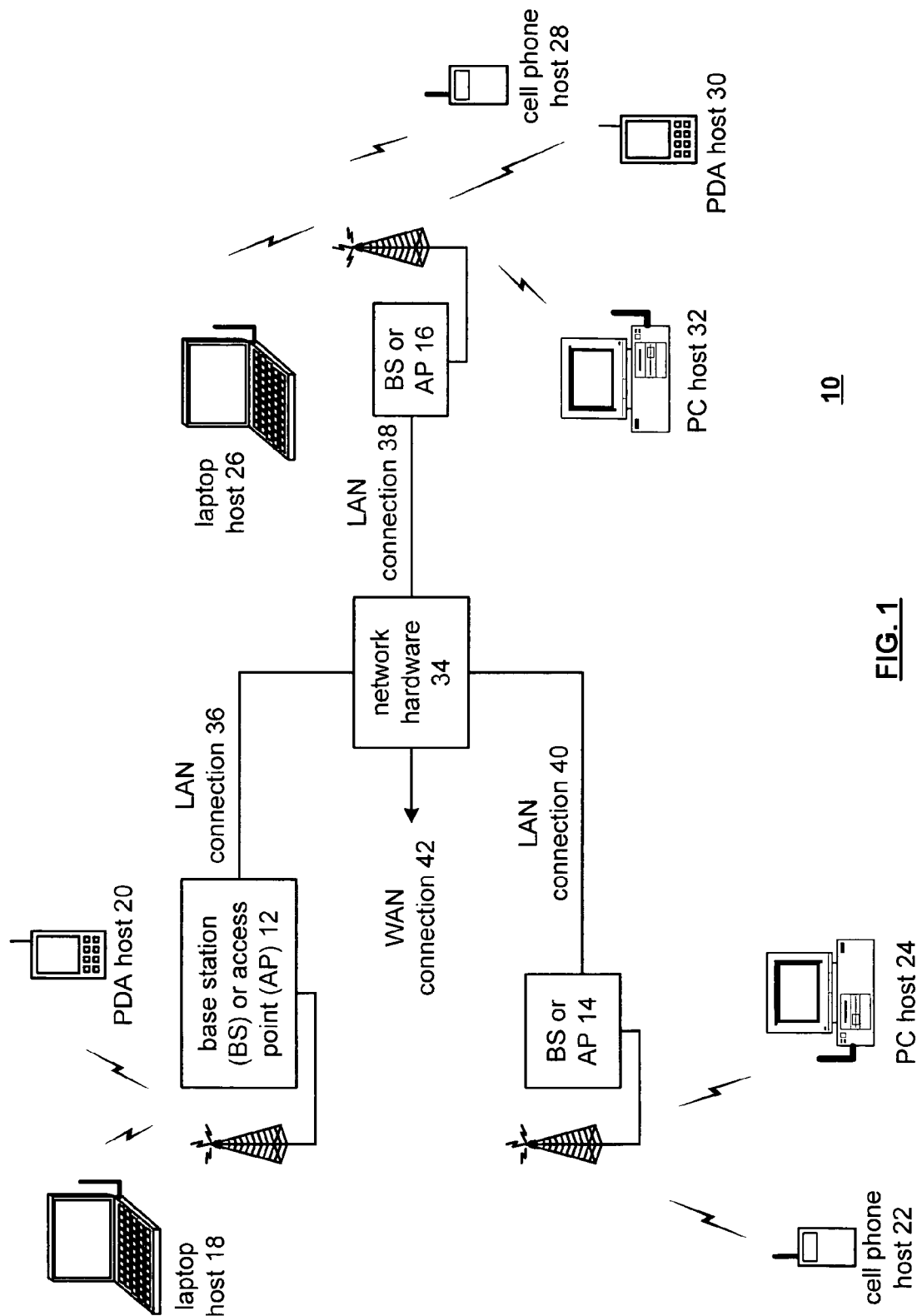
FIG. 1 is a schematic block diagram of a wireless communication system in accordance with the present invention.

FIG. 1 is a schematic block diagram illustrating a communication system 10 that includes a plurality of base stations and/or access points 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 2.

The base stations or access points 12-16 are operably coupled to the network hardware 34 via local area network connections 36, 38 and 40. The network hardware 34, which may be a router, switch, bridge, modem, system controller, et cetera provides a wide area network connection 42 for the communication system 10. Each of the base stations or access points 12-16 has an associated antenna or antenna array to communicate with the wireless communication devices in its area via one or more configurable channels within one or more frequency bands. Typically, the wireless communication devices register with a particular base station or access point 12-14 to receive services from the communication system 10. For direct connections (i.e., point-to-point communications), wireless communication devices communicate directly via an allocated channel of the configurable channels.

Typically, base stations are used for cellular telephone systems and like-type systems, while access points are used for in-home or in-building wireless networks. Regardless of the particular type of communication system, each wireless communication device includes a built-in radio and/or is coupled to a radio. The radio includes a highly linear amplifier and/or programmable multi-stage amplifier as disclosed herein to enhance performance, reduce costs, reduce size, and/or enhance broadband applications.

Figure 2:
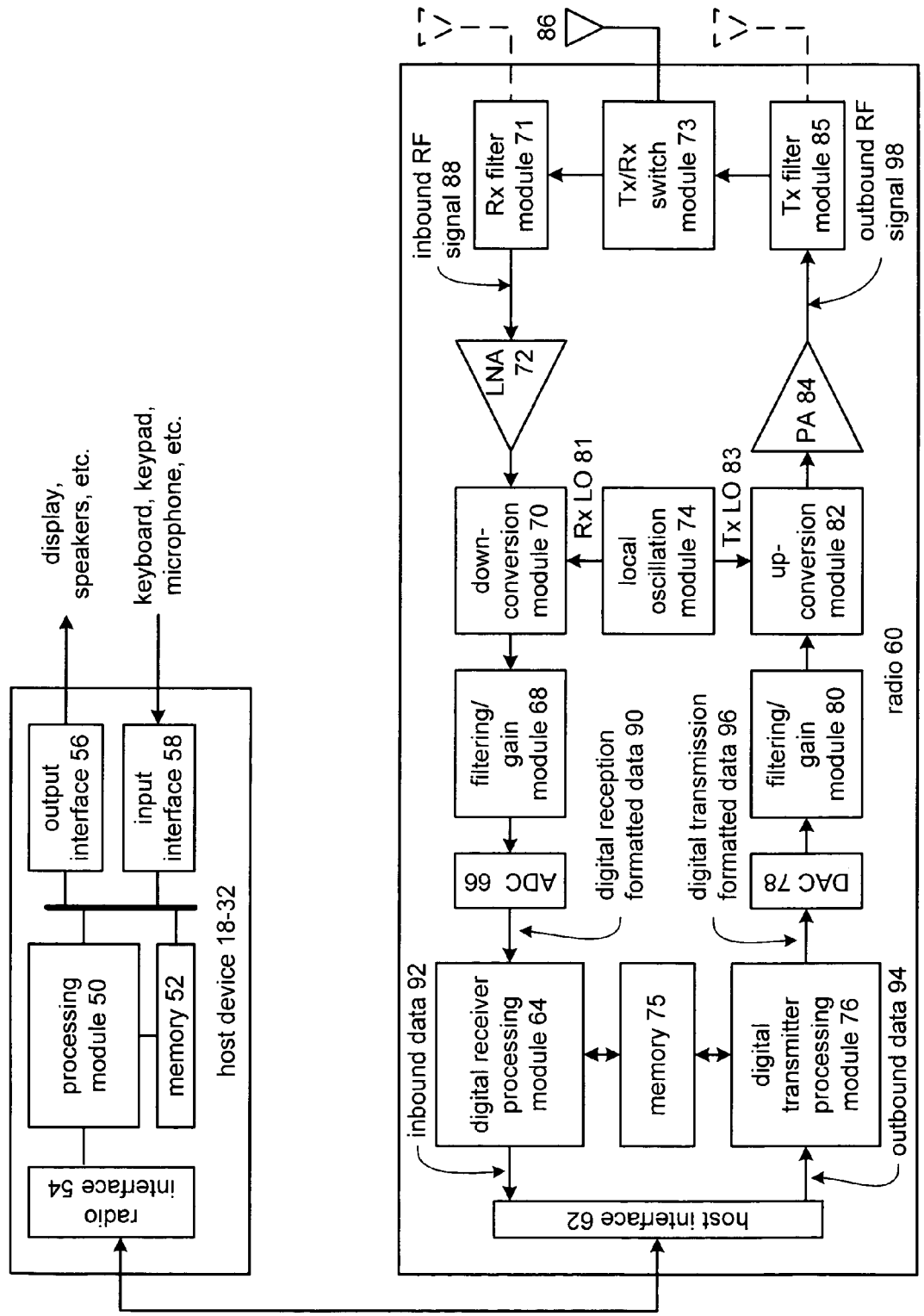
FIG. 2 is a schematic block diagram of a wireless communication device in accordance with the present invention.

FIG. 2 is a schematic block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, digital receiver processing module 64, an analog-to-digital converter 66, a filtering/gain module 68, an IF mixing down conversion stage 70, a receiver filter 71, a low noise amplifier 72, a transmitter/receiver switch 73, a local oscillation module 74, memory 75, a digital transmitter processing module 76, a digital-to-analog converter 78, a filtering/gain module 80, an IF mixing up conversion stage 82, a power amplifier 84, a transmitter filter module 85, and an antenna 86. The antenna 86 may be a single antenna that is shared by the transmit and receive paths as regulated by the Tx/Rx switch 73, or may include separate antennas for the transmit path and receive path. The antenna implementation will depend on the particular standard to which the wireless communication device is compliant.

The digital receiver processing module 64 and the digital transmitter processing module 76, in combination with operational instructions stored in memory 75, execute digital receiver baseband functions and digital transmitter baseband functions, respectively. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The host interface 62 routes the outbound data 94 to the digital transmitter processing module 76, which processes the outbound data 94 in accordance with a particular wireless communication standard (e.g., IEEE 802.11 Bluetooth, et cetera) to produce digital transmission formatted data 96. The digital transmission formatted data 96 will be a digital base-band signal or a digital low IF signal, where the low IF typically will be in the frequency range of one hundred kilohertz to a few megahertz. Further, the digital transmission formatted data 96 will be based on the channel width of the RF channel on which the data 96 will ultimately be transmitted. For example, the channel width may be 10 MHz, 20 MHz, or 40 MHz. Continuing with the example, if the channel is an OFDM (orthogonal frequency division multiplexing) channel, a 10 MHz wide channel may include 32 subcarrier frequencies, a 20 MHz wide channel may include 64 subcarrier frequencies, and a 40 MHz wide channel may include 128 subcarrier frequencies, where the number of subcarriers used per channel is at least partially based on the spectral masked configured for the channel. Configuring the spectral mask will be described in greater detail with reference to FIGS. 3-6.

The digital-to-analog converter 78 converts the digital transmission formatted data 96 from the digital domain to the analog domain. The filtering/gain module 80 filters and/or adjusts the gain of the analog signal prior to providing it to the IF mixing stage 82. The IF mixing stage 82 converts the analog baseband or low IF signal into an RF signal based on a transmitter local oscillation 83 provided by local oscillation module 74. The power amplifier 84 amplifies the RF signal to produce outbound RF signal 98, which is filtered by the transmitter filter module 85. The antenna 86 transmits the outbound RF signal 98 to a targeted device such as a base station, an access point and/or another wireless communication device. Note that the bandpass regions of the filters 80 and 85 are dependent upon the configured spectral mask for the RF transmission, which may be determined by the digital transmitter processing module 76.

The radio 60 also receives an inbound RF signal 88 via the antenna 86, which was transmitted by a base station, an access point, or another wireless communication device. The antenna 86 provides the inbound RF signal 88 to the receiver filter module 71 via the Tx/Rx switch 73, where the Rx filter 71 bandpass filters the inbound RF signal 88. The Rx filter 71 provides the filtered RF signal to low noise amplifier 72, which amplifies the signal 88 to produce an amplified inbound RF signal. The low noise amplifier 72 provides the amplified inbound RF signal to the IF mixing module 70, which directly converts the amplified inbound RF signal into an inbound low IF signal or baseband signal based on a receiver local oscillation 81 provided by local oscillation module 74. The down conversion module 70 provides the inbound low IF signal or baseband signal to the filtering/gain module 68. The filtering/gain module 68 filters and/or gains the inbound low IF signal or the inbound baseband signal to produce a filtered inbound signal. Note that the bandpass regions of the filters 71 and 68 are dependent upon the configured spectral mask for the RF transmission, which may be determined by the receiver processing module 64.

The analog-to-digital converter 66 converts the filtered inbound signal from the analog domain to the digital domain to produce digital reception formatted data 90. The digital receiver processing module 64 decodes, descrambles, demaps, and/or demodulates the digital reception formatted data 90 to recapture inbound data 92 in accordance with the particular wireless communication standard being implemented by radio 60 and the particular channel width of the channel. The host interface 62 provides the recaptured inbound data 92 to the host device 18-32 via the radio interface 54.

As one of average skill in the art will appreciate, the wireless communication device of FIG. 2 may be implemented using one or more integrated circuits. For example, the host device may be implemented on one integrated circuit, the digital receiver processing module 64, the digital transmitter processing module 76 and memory 75 may be implemented on a second integrated circuit, and the remaining components of the radio 60, less the antenna 86, may be implemented on a third integrated circuit. As an alternate example, the radio 60 may be implemented on a single integrated circuit. As yet another example, the processing module 50 of the host device and the digital receiver and transmitter processing modules 64 and 76 may be a common processing device implemented on a single integrated circuit. Further, the memory 52 and memory 75 may be implemented on a single integrated circuit and/or on the same integrated circuit as the common processing modules of processing module 50 and the digital receiver and transmitter processing module 64 and 76.

Figure 3:
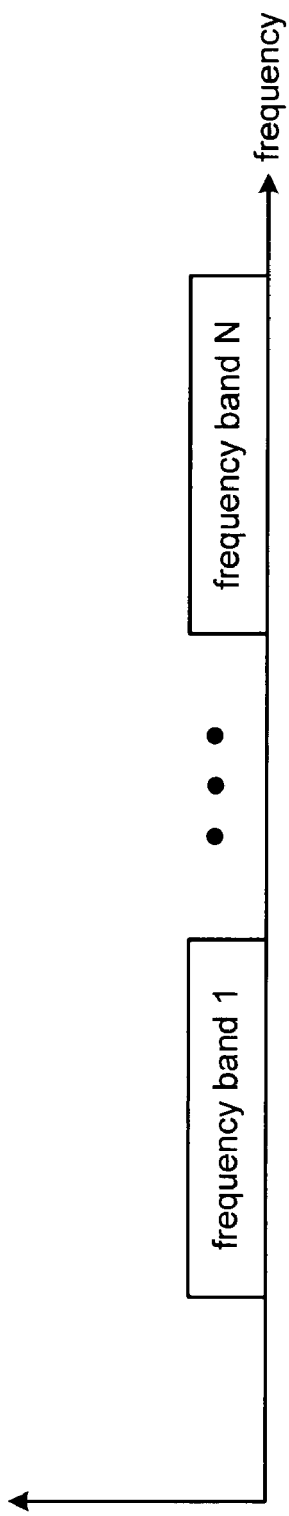
FIG. 3 is a diagram depicting frequency bands that may be used in accordance with the present invention.

FIG. 3 is a diagram depicting a plurality of frequency bands (e.g., frequency band 1 through frequency band N), which are defined by a governmental agency for particular wireless applications. For example, the Federal Communications Commission (FCC) defines, for the United States, frequency bands for specific uses and for which an FCC license is required (e.g., radio transmissions, television transmissions, etc.) and also defines frequency bands that are unlicensed and, as such, can be used for a variety of applications. For instance, the FCC has defined several frequency bands in the radio frequency spectrum as being unlicensed. Such unlicensed frequency bands include 902-928 MHz, 2.4-2.483 GHz and 5.75-5.85 GHz, which are collectively referred to as the ISM (Industrial Scientific Medical) band. Currently, the ISM band is used for in-building and system applications (e.g., bar code readers), industrial microwave ovens, wireless patient monitors, and wireless local area networks (WLAN).

Figure 4:
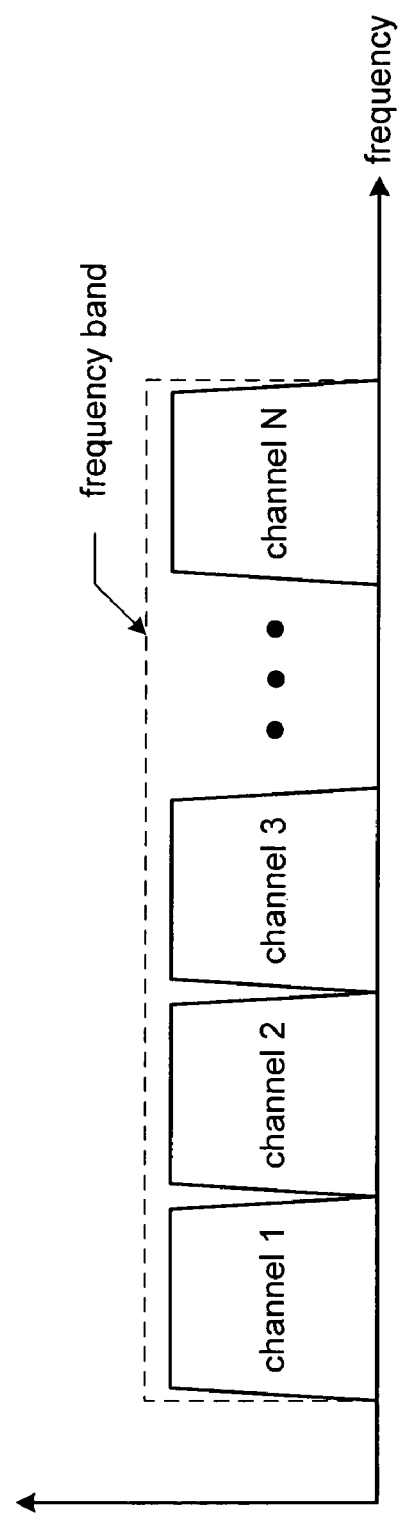
FIG. 4 is a diagram depicting channel partitioning of a frequency band in accordance with the present invention.

FIG. 4 is a diagram depicting a particular frequency band that is divided into a plurality of channels. In accordance with the present invention, the channel width of each channel is selectable. As such, for a given frequency band, the number of channels will vary depending on the selected channel width. For instance, in one embodiment of the present invention, the channel width may be selected in accordance with IEEE 802.11 (a) or (g), where IEEE 802.11 (a) provides wireless LAN operation specifications in the 5.15 to 5.35 GHz band. In general, the specified modulation schemes are based on Orthogonal Frequency Division Multiplexing (OFDM) which, for 802.11(a) divides the 5.15 to 5.35 GHz band into eight 20 MHz wide channels centered at 5.18, 5.20, 5.22, 5.24, 5.36, 5.28, and 5.30 GHz. In another embodiment of the present invention, the 5.15 to 5.35 GHz band may be divided into eighteen 10 MHz wide channels, with the first channel centered at 5.165 GHz and the remaining eleven centered at 10 MHz increments therefrom. In yet another embodiment of the present invention, the 5.15 to 5.35 GHz band may be dividing into three 40 MHz wide channels, with the channels centered at 5.21, 5.25, and 5.29 GHz. The same channel width selectivity may be applied to the 2.4-2.482 GHz band covered by IEEE 802.11 (g), other frequency bands covered by an IEEE 802.11 standard, and/or any other wireless communication standard. The selectivity of the channel width provides for greater data throughput (e.g., at least twice the data rate of IEEE 802.11 (g)), for a diversity of applications, and/or for a single wireless communication device to support multiple wireless standards issued by various standard bodies, including governmental agencies.

Figure 5:
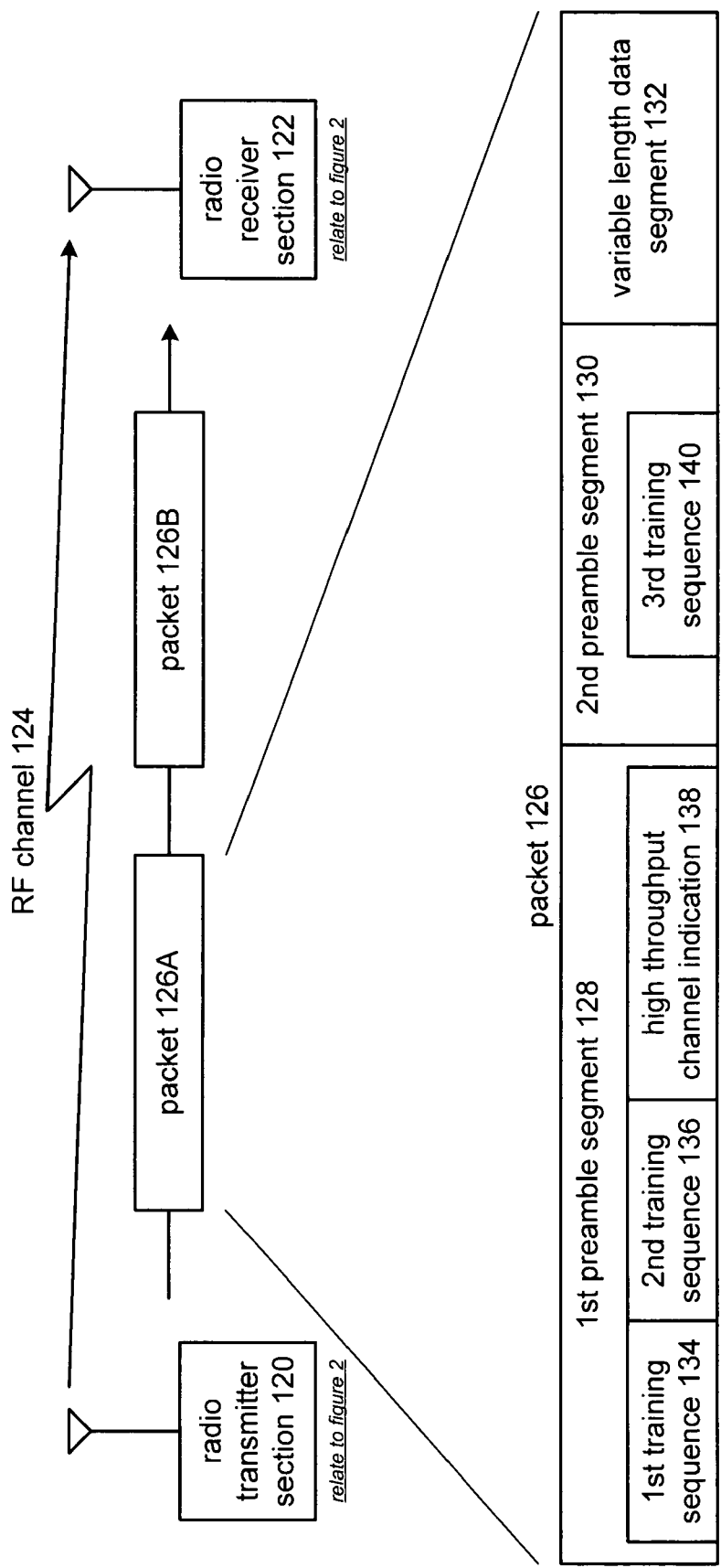
FIG. 5 is a diagram of transmitting frames via an RF channel in accordance with an embodiment of the present invention.

FIG. 5 is a diagram illustrating a radio transmitter section 120 transmitting frames 126A, 126B via a radio frequency (RF) channel 124 to a radio receiver section 122. The radio transmitter section 120 is in one wireless communication device and corresponds to the digital transmitter processing module 76, digital-to-analog converter 78, filter/gain module 80, up-conversion module 82, power amplifier 84 and transmit filter module 85 of the wireless communication device of FIG. 2. The radio receiver section 122, which is in another wireless communication device, corresponds to the digital receiver processing module 64, analog-to-digital converter 66, filter/gain module 68, down-conversion module 70, the low noise amplifier 72 and receive filter module 71 of the wireless communication device of FIG. 2. The channel 124 may be any one of the channels illustrated in FIG. 3 and may have any spectral mass configuration as described in co-pending patent application having a Ser. No. 60/524,528, an attorney docket number of BP3400, entitled CONFIGURABLE SPECTRAL MASK FOR USE IN A HIGH DATA THROUGHPUT WIRELESS COMMUNICATION, with a filing date of Nov. 24, 2003.

The format of frames 126A, B includes a $1^{st}$ preamble section 128, a $2^{nd}$ preamble section 130, and a variable length data segment 132. The $1^{st}$ preamble training segment 128 includes a $1^{st}$ training sequence 134, a $2^{nd}$ training sequence 136 and a high throughput channel indication 138. The $2^{nd}$ preamble segment 130 includes a $3^{rd}$ training sequence 140. In one embodiment, the $1^{st}$ training sequence 134 and $2^{nd}$ training sequence 136 may correspond to the short and long training sequences of a preamble in accordance with IEEE802.11a or g. The high throughput channel indication 138 is set when the transmitting radio desires to use a high throughput channel configuration. If the high throughput channel indication is not set, the $2^{nd}$ preamble segment 130 would be ignored and the frame would be formatted similarly to legacy wireless local area networks that operate in accordance with IEEE802.11a, b, g, et cetera.

With the high throughput channel indication 138 set, the $3^{rd}$ training sequence 140 of the $2^{nd}$ preamble segment is implemented to fine-tune the radio receiver according to the particular channel configuration. The variable length data segment 132 includes a guard interval and associated data fields. The formatting of frame 126 is described in greater detail with reference to FIG. 6.

Figure 6:
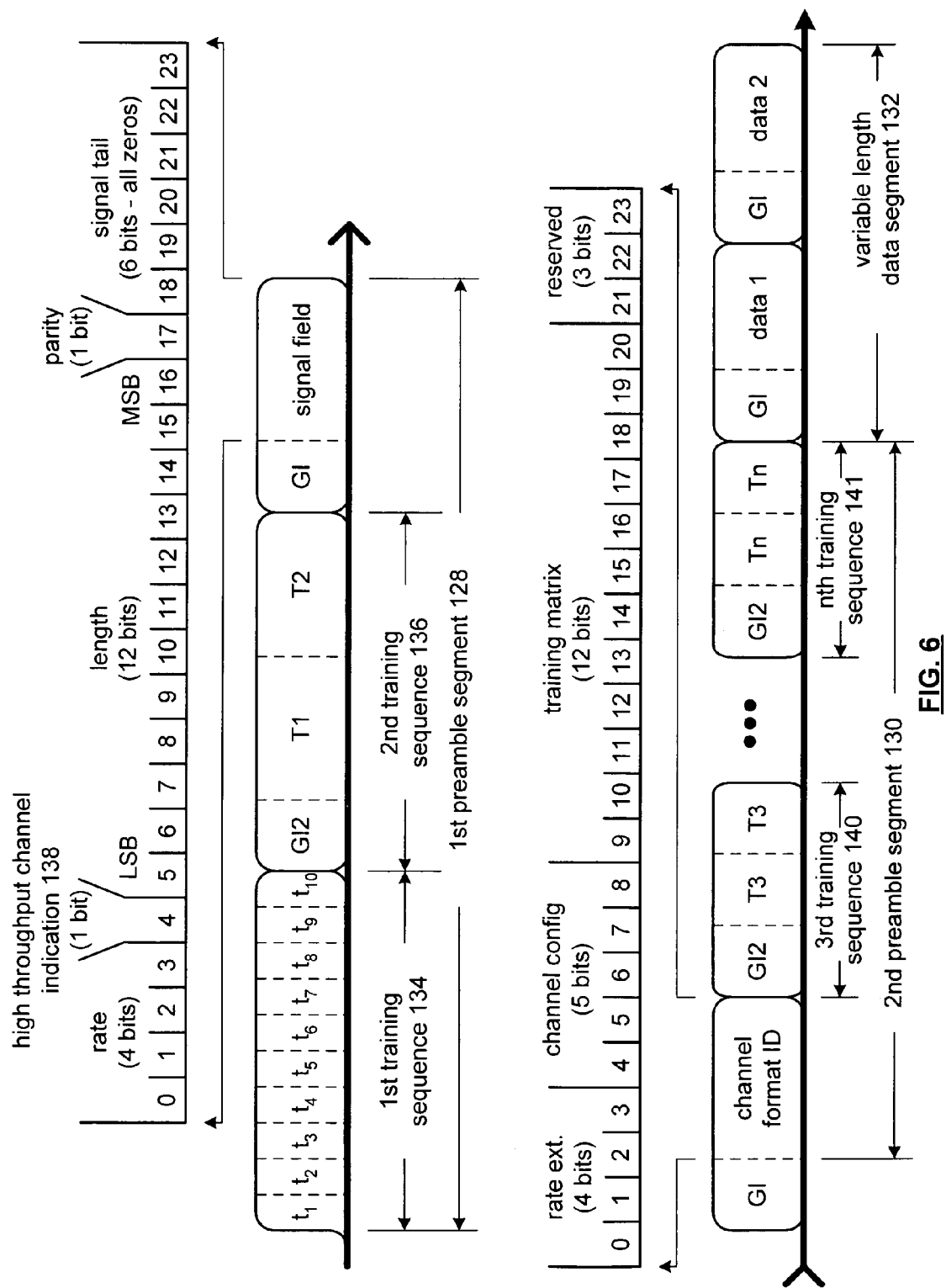
FIG. 6 is a diagram of a frame format in accordance with an embodiment of the present invention.

FIG. 6 illustrates the frame 126 in greater detail. As shown, the $1^{st}$ preamble segment 128 includes the $1^{st}$ training sequence 134, the $2^{nd}$ training sequence 136 and a signal field. The $1^{st}$ training sequence 134 includes 10 short training sequences that utilize only a portion of the sub-carriers of the particular channel. For instance, the channel configuration may be a 20 MHz channel bandwidth with 64 sub-carriers. The $1^{st}$ training sequence 134 may only use 12 of the 52 data sub-carriers to convey the corresponding short training sequence. The 2 training sequence 136 includes 2 long training sequences that may utilize 52 of the 52 data sub-carriers of a 20 MHz, 64 sub-carrier channel.

The signal field includes a guard interval (GI) and includes 24 bits of information. The $1^{st}$ 4 bits correspond to the rate of the data transmission, the next bit indicates the high through-put channel indication 138, the next 12 bits correspond to the length of the variable length data segment 132, bit 17 corresponds to the parity of the data and the remaining 6 bits correspond to a signal tail.

If the high throughput channel indication 138 is not set, the receiving radio will configure itself based on a default or $1^{st}$ channel configuration which may be the 20 MHz bandwidth channel utilizing 64 sub-carriers as currently defined in IEEE802.11a and/or g. If, however, the high throughput channel indication 138 is set, and the receiver is capable of alternative channel configurations, it will begin interpreting the $2^{nd}$ preamble.

The $2^{nd}$ preamble segment 130 includes a channel format identification field and a plurality of training sequences 140-141. The channel identification field may include an additional 4-bits for rate information, 5-bits of channel configuration information, 12-bits to indicate a training matrix, and the remaining 3-bits may be reserved. As one of average skill in the art will appreciate, the 24-bits of the channel format identification field may be configured in a variety of ways to convey information to the receiving radio as to the bit rate of the high throughput data, the channel configuration on which the high throughput data will be conveyed, a diversity antenna arrangement, and a channel matrix to produce dual RF transmissions over a single channel.

Once the channel format identification field has been processed, the receiving radio reconfigures itself based on the channel configuration and the data rate. Having reconfigured itself, the radio receives the $3^{rd}$ training sequence 140 through the nth training sequence 141 (where corresponds to the number of transmitting antennas) that utilizes a majority of the sub-carriers in accordance with the new channel configuration. The channel configurations will be described in greater detail with reference to FIG. 7.

The rate bits in the $1^{st}$ preamble and $2^{nd}$ preamble may be used in combination to provide 8-bits of rate information and/or may be used separately to provide, in the case of dual communications over a single path, to indicate the rates of the separate communications. The variable length data segment 132 includes a plurality of data segments and associated guard intervals (GI).

FIG. 7 is a table illustrating the various channel configurations, which may be utilized to convey the high data throughput communications. The channel configuration table includes a column for the bits to index the particular channel configuration and configuration information, which includes channel bandwidth, number of sub-carriers per channel, rate interpretation (i.e., are the rate bits in each of the preamble sections to be combined or used separately) and space time coding (i.e., the number of channel paths that the particular RF channel is supporting). In this example, there are 3 channel bandwidth options, 10 MHz, 20 MHz, and 40 MHz, which may be used in any one of a number of frequency bands, including, but not limited to, 2.400-2.4835 GHz, 2.471-2.497 GHz, 5.15-5.25 GHz, 5.25-5.35 GHz, 5.47-5.725 GHz, 5.725 GHz-5.825 GHz, 4.9-5.3 GHz, and 5.85-5.925 GHz. The default operation of the wireless communication system in accordance with the present invention would operate as defined in IEEE 802.11a or g. As is known, the channel configuration for 802.11a and/or g includes a 20 MHz channel bandwidth utilizing 64 sub-carriers where only 1 path is supported by the RF channel. Hence, the default channel configuration is not in the channel configuration information in the $2^{nd}$ preamble section.

If, however, a 20 MHz bandwidth channel is used that has spatial time coding that supports 2 paths via a single RF channel, then a higher data throughput is achieved. In one instance, the rate on both channels is the same corresponding to a rate interpretation of 0, which allows the eight bits (4 from the first preamble segment and 4 from the second preamble segment to be combined into one 8 bit code). If the rates for the 2 paths in space time coding are different, then the rate interpretation is 1. In this instance, the 4 bits of rate information in the $1^{st}$ preamble segment is used to indicate the rate of one of the channel paths and the 4 bits of rate information in the $2^{nd}$ preamble segment are used to indicate the rate of the other channel path.

As is further shown in the table, the 40 MHz channel bandwidth may include 128 sub-carriers and support 1 or 2 paths per channel. Similarly, the 10 MHz channel bandwidth has 64 sub-carriers and may support 1 or 2 channel paths.

Figure 8:
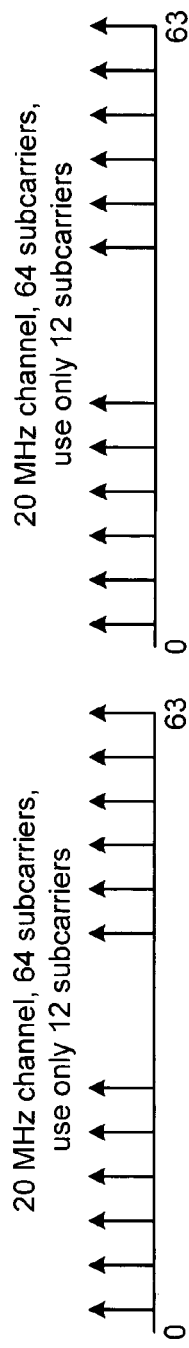
FIG. 8 is a diagram of a first training sequence in accordance with the present invention.

FIG. 8 is a diagram illustrating the $1^{st}$ training sequence 114 that is based on a 20 MHz channel and 64 sub-carriers per channel. The training sequence is repeated twice and only uses 12 sub-carriers of the total 64 sub-carriers. In one embodiment, each of the 12 sub-carriers carries a symbol that is either 1+j or $^-1^-$j. During this part of the preamble, the receiver is utilizing the $1^{st}$ training sequence 114 as a signal detect and once a possible signal is detected to adjust the gain settings within the receiver as well as to determine whether any diversity antenna selections have been made. In addition, the receiver, during the later portions of the $1^{st}$ training sequence 114, may be performing coarse frequency adjustments, offset estimations, and/or timing synchronizations.

Figure 9:
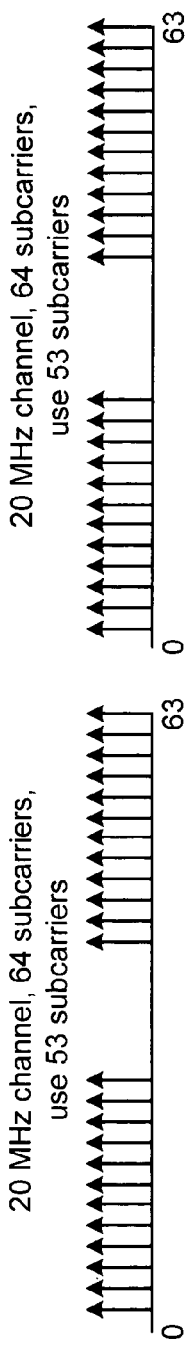
FIG. 9 is a diagram of a second training sequence in accordance with the present invention.

FIG. 9 is a diagram illustrating the $2^{nd}$ training sequence 116 that utilizes a 20 MHz channel bandwidth with 64 sub-carriers. Of the 64 sub-carriers, 53 are used in the $2^{nd}$ training sequence 116. Each sub-carrier carries a symbol of +1 or $^-$1, except for the $0^{th}$ subcarrier, which carries a zero value. As the receiver is detecting the $2^{nd}$ training sequence 116 it may be performing channel and fine frequency adjustments and/or fine offset adjustments.

Figure 10:
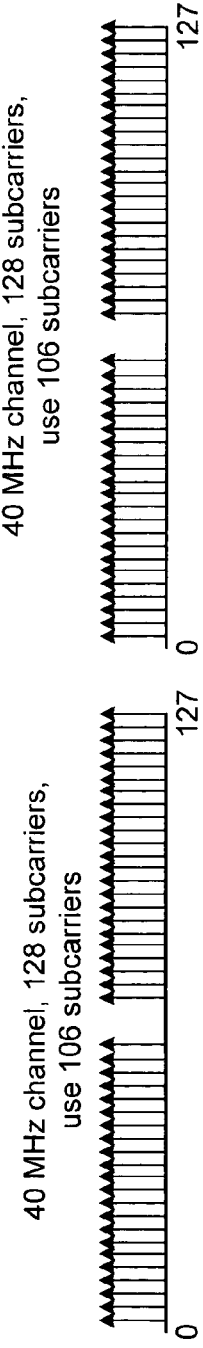
FIG. 10 is a diagram of a third training sequence in accordance with the present invention.

FIG. 10 is a diagram illustrating the $3^{rd}$ training sequence 120 of a 40 MHz channel utilizing single space time channel partitioning and including 128 subcarriers. In this instance, the preamble uses 105-119 of the 128 sub-carriers wherein the symbols may be +1 or $^-$1 to convey the training sequence. At this phase, the receiver is again performing channel and fine frequency adjustments corresponding to the 40 MHz channel 128 sub-carrier configuration of the channel. In addition, the receiver may be performing fine offset adjustments for the particular channel configuration.

Figure 11:
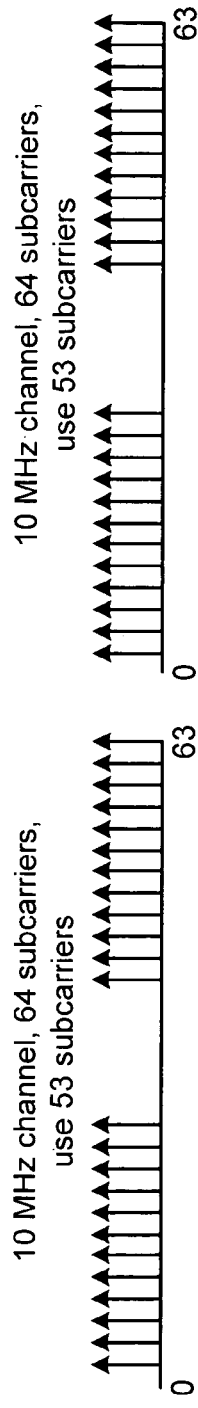
FIG. 11 is a diagram of an alternative third training sequence in accordance with the present invention.

FIG. 11 is a diagram of an alternate $3^{rd}$ training sequence 120 where the channel configuration is a 10 MHz channel having 64 sub-carriers. In this instance, the $3^{rd}$ training sequence 120 utilizes 53 sub-carriers of the 64 possible sub-carriers. During this time frame, the receiver is performing channel and fine frequency adjustments and/or fine offset adjustments for the 10 MHz bandwidth, 64 sub-carrier channel. Note that the symbols utilized in the training sequence may be +1 or $^-$1.

Figure 12:
FIG. 12 is a diagram of another third training sequence in accordance with the present invention.
Figure 12:
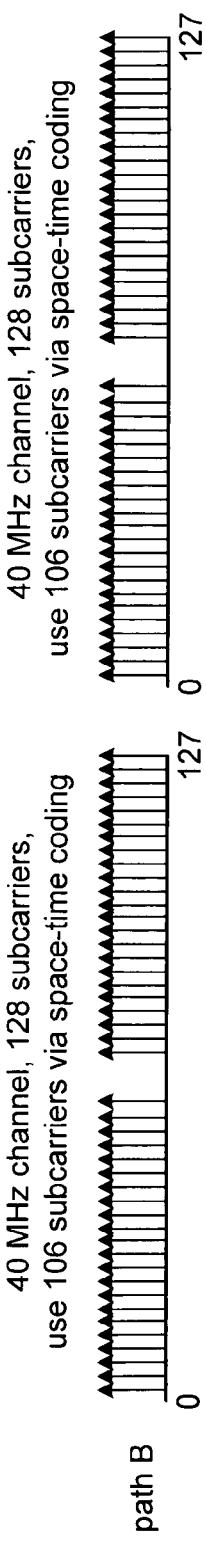

FIG. 12 is a diagram illustrating the $3^{rd}$ training sequence 120 where the channel selection is a 40 MHz channel, having 128 sub-carriers and utilizes space time encoding to produce 2 paths (path A and path B). In this instance, each path has its own corresponding training sequence that utilizes 105-119 sub-carriers of the possible 128 sub-carriers. The symbols in each sub-carrier may be a +1 or $^-$1. During this time frame, the receiving radio may be performing channel and fine frequency adjustments and/or fine offset adjustments for each path of the 40 MHz channel.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented a new frame format and radio transmitter for high data throughput wireless local area network transmissions, with backward compatibility to legacy systems. As one of average skill in the art will appreciate, other embodiments may be derived from the teaching of the present invention without deviating from the scope of the claims.

What is claimed is:

1. A frame format for high data throughput wireless local area network transmissions, the frame format comprises:
   a first preamble segment including a first training sequence, a second training sequence, and a high throughput channel indication, wherein the first training sequence is within a first set of subcarriers of a channel and the second training sequence is within a second set of subcarriers of the channel, wherein the first set of subcarriers is a subset of the second set of subcarriers;
   a second preamble segment including a third training sequence within a third set of subcarriers of the channel, wherein the second set of subcarriers is a subset of the third set of subcarriers; and
   a variable length data segment utilizing the third set of subcarriers to convey data.

2. The frame format of claim 1, wherein the first preamble segment comprises:
   the first training sequence corresponding to a short training sequence;
   the second training sequence corresponding to a long training sequence; and
   a signal field that includes a rate indication, an indication of length of the variable length data segment, and the high throughput channel indication.

3. The frame format of claim 1, wherein the second preamble segment comprises:
   a channel format indication field to identify one of a plurality of high throughput channel formats; and
   high throughput channel training field that includes the third training sequence, wherein the third training sequence corresponds to the one of the plurality of high throughput channel formats.

4. The frame format of claim 3, wherein the plurality of high throughput channel formats comprises at least two of:
   a 40 Mega Hertz (MHz) channel with $2^N$ subcarriers transmitted via a single antenna;
   a 20 MHz channel with $2^M$ subcarriers transmitted via the single antenna;
   a 10 MHz channel with $2^K$ subcarriers transmitted via the single antenna;
   the 40 MHz channel with $2^N$ subcarriers transmitted via multiple antennas;
   the 20 MHz channel with $2^M$ subcarriers transmitted via the multiple antennas; and
   the 10 MHz channel with $2^K$ subcarriers transmitted via the multiple antennas.

5. The frame format of claim 4, wherein, when the one of the plurality of high throughput channel formats is the 40 MHz channel with $2^N$ subcarriers transmitted via the single antenna, the third training sequence comprises:
   a final channel estimation using the $2^N$ subcarriers of the 40 MHz channel.

6. The frame format of claim 4, wherein, when the one of the plurality of high throughput channel formats is the 20 MHz channel with $2^M$ subcarriers transmitted via the single antenna, the third training sequence comprises:
   a final channel estimation using the $2^M$ subcarriers of the 20 MHz channel.

7. The frame format of claim 4, wherein, when the one of the plurality of high throughput channel formats is the 10 MHz channel with $2^K$ subcarriers transmitted via the single antenna, the third training sequence comprises:
   a final channel estimation using the $2^K$ subcarriers of the 10 MHz channel.

8. The frame format of claim 4, wherein, when the one of the plurality of high throughput channel formats is the 40 MHz channel with $2^N$ subcarriers transmitted via the multiple antennas, the third training sequence comprises:
   a first final channel estimation using the $2^N$ subcarriers of the 40 MHz channel transmitted via a first one of the multiple antennas; and
   a second final channel estimate using the $2^N$ subcarriers of the 40 MHz channel transmitted via a second one of the multiple antennas.

9. The frame format of claim 4, wherein, when the one of the plurality of high throughput channel formats is the 20 MHz channel with $2^M$ subcarriers transmitted via the multiple antennas, the third training sequence comprises:
   a first final channel estimation using the $2^M$ subcarriers of the 20 MHz channel transmitted via a first one of the multiple antennas; and
   a second final channel estimate using the $2^M$ subcarriers of the 20 MHz channel transmitted via a second one of the multiple antennas.

10. The frame format of claim 4, wherein, when the one of the plurality of high throughput channel formats is the 10 MHz channel with $2^K$ subcarriers transmitted via the multiple antennas, the third training sequence comprises:
    a first final channel estimation using the $2^K$ subcarriers of the 10 MHz channel transmitted via a first one of the multiple antennas; and
    a second final channel estimate using the $2^K$ subcarriers of the 10 MHz channel transmitted via a second one of the multiple antennas.

11. An apparatus for transmitting a frame within a high throughput wireless local area network, the apparatus comprises:
    processing module;
    memory operably coupled to the processing module, wherein the memory stores operational instructions that cause the processing module to prepare the frame by:
       generating a first preamble segment including a first training sequence, a second training sequence, and a high throughput channel indication, wherein the first training sequence is within a first set of subcarriers of a channel and the second training sequence is within a second set of subcarriers of the channel, wherein the first set of subcarriers is a subset of the second set of subcarriers;
       generating a second preamble segment including a third training sequence within a third set of subcarriers of the channel, wherein the second set of subcarriers is a subset of the third set of subcarriers;
       generating a variable length data segment utilizing the third set of subcarriers to convey data; and
    radio frequency transmission circuit operably coupled to transmit the first preamble segment, the second preamble segment, and the variable length data segment as the frame.

12. The apparatus of claim 11, wherein the first preamble segment comprises:
    the first training sequence corresponding to a short training sequence;
    the second training sequence corresponding to a long training sequence; and
    a signal field that includes a rate indication, an indication of length of the variable length data segment, and the high throughput channel indication.

13. The apparatus of claim 11, wherein the second preamble segment comprises:

a channel format indication field to identify one of a plurality of high throughput channel formats; and high throughput channel training field that includes the third training sequence, wherein the third training sequence corresponds to the one of the plurality of high throughput channel formats.

14. The apparatus of claim 13, wherein the plurality of high throughput channel formats comprises at least two of:
   a 40 Mega Hertz (MHz) channel with $2^N$ subcarriers transmitted via a single antenna;
   a 20 MHz channel with $2^M$ subcarriers transmitted via the single antenna;
   a 20 MHz channel with $2^K$ subcarriers transmitted via the single antenna;
   a 40 MHz channel with $2^N$ subcarriers transmitted via multiple antennas;
   a 20 MHz channel with $2^M$ subcarriers transmitted via the multiple antennas; and
   a 10 MHz channel with $2^K$ subcarriers transmitted via the multiple antennas.

15. The apparatus of claim 14, wherein, when the one of the plurality of high throughput channel formats is the 40 MHz channel with $2^N$ subcarriers transmitted via the single antenna, the third training sequence comprises:
   a final channel estimation using the $2^N$ subcarriers of the 40 MHz channel.

16. The apparatus of claim 14, wherein, when the one of the plurality of high throughput channel formats is the 20 MHz channel with $2^M$ subcarriers transmitted via the single antenna, the third training sequence comprises:
   a final channel estimation using the $2^M$ subcarriers of the 20 MHz channel.

17. The apparatus of claim 14, wherein, when the one of the plurality of high throughput channel formats is the 10 MHz channel with $2^K$ subcarriers transmitted via the single antenna, the third training sequence comprises:
   a final channel estimation using the $2^K$ subcarriers of the 10 MHz channel.

18. The apparatus of claim 14, wherein, when the one of the plurality of high throughput channel formats is the 40 MHz channel with $2^N$ subcarriers transmitted via the multiple antennas, the third training sequence comprises:
   a first final channel estimation using the $2^N$ subcarriers of the 40 MHz channel transmitted via a first one of the multiple antennas; and
   a second final channel estimate using the $2^N$ subcarriers of the 40 MHz channel transmitted via a second one of the multiple antennas.

19. The apparatus of claim 14, wherein, when the one of the plurality of high throughput channel formats is the 20 MHz channel with $2^M$ subcarriers transmitted via the multiple antennas, the third training sequence comprises:
   a first final channel estimation using the $2^M$ subcarriers of the 20 MHz channel transmitted via a first one of the multiple antennas; and
   a second final channel estimate using the $2^M$ subcarriers of the 20 MHz channel transmitted via a second one of the multiple antennas.

20. The apparatus of claim 14, wherein, when the one of the plurality of high throughput channel formats is the 10 MHz channel with $2^K$ subcarriers transmitted via the multiple antennas, the third training sequence comprises:
   a first final channel estimation using the $2^K$ subcarriers of the 10 MHz channel transmitted via a first one of the multiple antennas; and
   a second final channel estimate using the $2^K$ subcarriers of the 10 MHz channel transmitted via a second one of the multiple antennas.

* * * * *